(12) United States Patent
Conway

(10) Patent No.: US 7,099,281 B1
(45) Date of Patent: Aug. 29, 2006

(54) PASSIVE SYSTEM AND METHOD FOR MEASURING THE SUBJECTIVE QUALITY OF REAL-TIME MEDIA STREAMS IN A PACKET-SWITCHING NETWORK

(75) Inventor: Adrian Evans Conway, Weston, MA (US)

(73) Assignees: Verizon Corproate Services Group Inc., New York, NY (US); Genuity Inc., Newton, MA (US)

( * ) Notice: Subject to any disclaimer, the term of this patent is extended or adjusted under 35 U.S.C. 154(b) by 903 days.

(21) Appl. No.: 09/822,043

(22) Filed: Mar. 30, 2001

(51) Int. Cl.
*H04L 1/20* (2006.01)
*H04L 12/66* (2006.01)

(52) U.S. Cl. .................. 370/252; 370/352; 370/401
(58) Field of Classification Search ............ 370/352, 370/353, 356, 389, 392, 400, 401, 902, 252; 379/900, 1.03, 1.04, 26.01, 27.01, 27.02, 379/27.03, 27.04; 704/220, 231, 233
See application file for complete search history.

(56) References Cited

U.S. PATENT DOCUMENTS

| | | | | |
|---|---|---|---|---|
| 5,127,001 A | * | 6/1992 | Steagall et al. | 370/267 |
| 5,343,463 A | * | 8/1994 | van Tetering et al. | 370/253 |
| 6,360,271 B1 | * | 3/2002 | Schuster et al. | 709/231 |
| 6,363,053 B1 | * | 3/2002 | Schuster et al. | 370/230 |
| 6,477,492 B1 | * | 11/2002 | Connor | 704/236 |
| 6,512,746 B1 | * | 1/2003 | Sand | 370/252 |
| 6,700,953 B1 | * | 3/2004 | Maurer et al. | 379/88.01 |
| 6,738,353 B1 | * | 5/2004 | Chong | 370/241 |
| 6,741,569 B1 | * | 5/2004 | Clark | 370/252 |

* cited by examiner

*Primary Examiner*—Doris H. To
*Assistant Examiner*—Soon D. Hyun
(74) *Attorney, Agent, or Firm*—Leonard C. Suchyta, Esq.; Joel Wall, Esq.; Rader, Fishman & Grauer PLLC

(57) ABSTRACT

In accordance with the present invention, a portion of a packetized data stream is copied from a data network without interfering with the flow of the data in the network. A known test signal is then substituted for the information contained in each copied packet to prepare a pseudo-media packet stream. The known test signal is encoded and packetized using the same methods used for the copied data stream. The pseudo-media signal is then recovered from the pseudo-media stream using the same depacketizing and decoding methods to be used on the copied packetized data stream. The recovered signal is an accurate representation of the state of the media stream since it has gone through the same packetization/depacketization and encoding/decoding procedures and includes all of the same faults of the copied data stream. The subjective quality of the recovered signal is then measured providing an accurate measure of the subjective quality of the copied media stream.

30 Claims, 4 Drawing Sheets

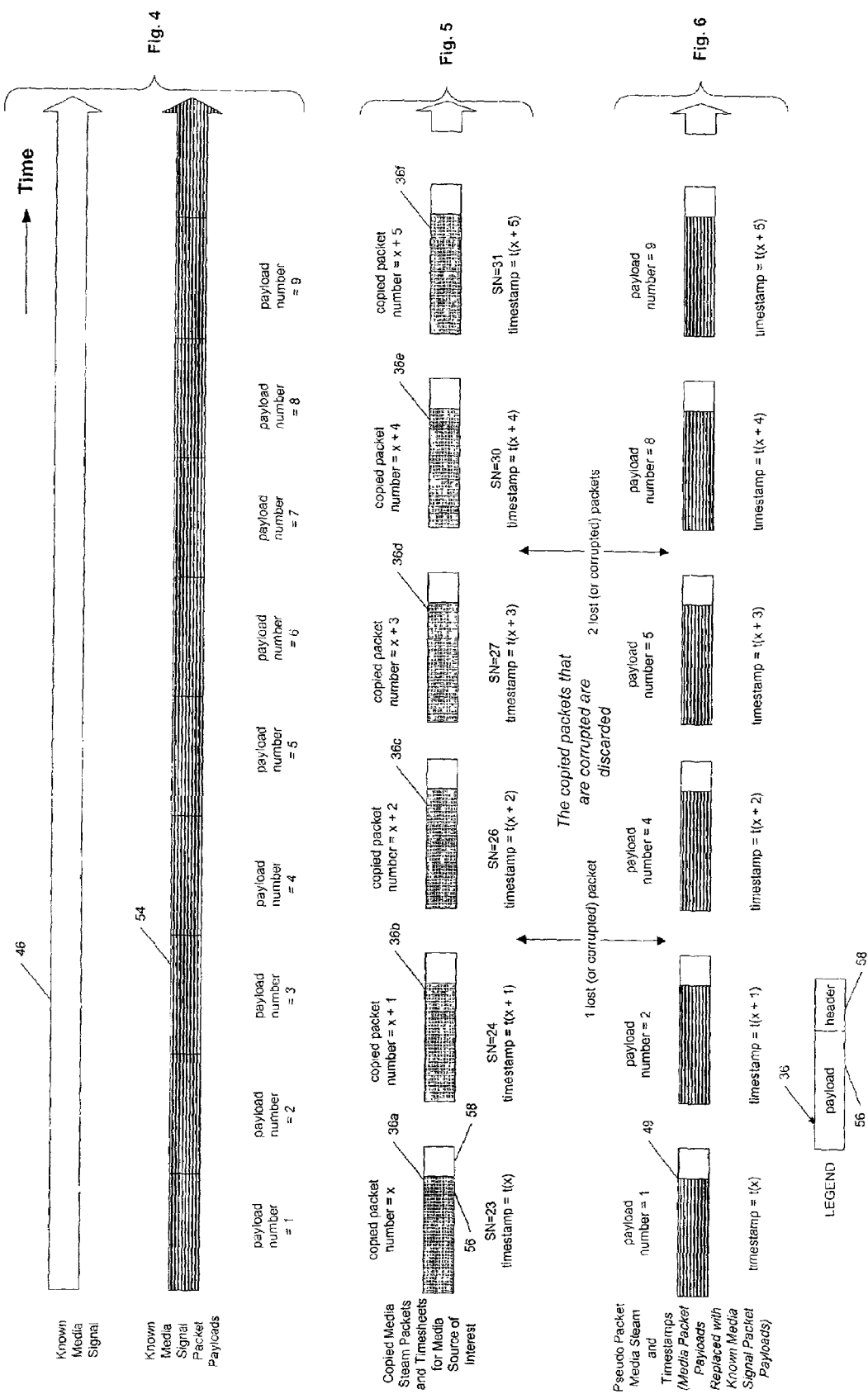

PASSIVE SYSTEM AND METHOD FOR MEASURING THE SUBJECTIVE QUALITY OF REAL-TIME MEDIA STREAMS IN A PACKET-SWITCHING NETWORK

BACKGROUND OF THE INVENTION

1. Field of the Invention

A system and method are disclosed for the non-intrusive determination of the subjective quality of a packetized real-time media data stream in a packet-switching network without interrupting the flow of the media stream or adding a known test signal in the packet-switching network.

2. Description of the Related Art

In recent years, packet-switching networks have been used increasingly for transport of real-time media such as, for example, voice and video media signals that are transmitted either real-time or delayed. The signals begin as either analog or digital signals. A specific example is the increasing use of the Internet for carrying voice-over-internet protocol (VoIP) calls. In a VoIP call, a digitally encoded voice signal is packetized into an Internet Protocol (IP) packet stream that is transmitted over the Internet to a destination device. At the destination device, the digitally encoded voice signal is extracted from VoIP packet payloads in the packet stream and then decoded into a signal that is played-out in real-time to the user at the destination.

When a packetized real-time media stream is transmitted across a packet-switching network, the packet stream may be corrupted by a number of network impairments. Examples of network impairments include packet-discarding at routers due to packet bit errors, packet-dropping at interface buffers due to traffic congestion, packet-duplication, packet-delay in time beyond its hard or soft real-time deadline at its destination, packet-misrouting, and loss of packet-sequence. These impairments generally degrade the quality of the media signal that is eventually received at the destination.

Due to network impairments that may be encountered in the transmission of real-time media over a packet-switching network, it is important to be able to measure and monitor the quality-of-service (QoS) that is being provided by the network. Typical network QoS measures include, for example, end-to-end packet delay, end-to-end packet delay jitter, packet corruption, and packet loss. To monitor such network QoS measures, one can deploy commercially available monitoring systems.

Although measurement and monitoring of network QoS provides valuable information regarding the ability of a network to properly support transmission of real-time media signals, such measures do not directly reflect the media signal subjective quality that is actually perceived by an end-user. This is the case since subjective quality of a real-time media signal, as perceived by the end-user, is difficult to quantify in terms of the network QoS measures. To deal with this general problem, objective methods have been developed for estimating subjective quality of media signals. For example, perceptual speech quality measurement, PSQM, is a means for objectively assessing the quality of speech that has been degraded by a telephony network. It has a high correlation to subjective quality across a range of distortion types, and is used to test networks that are subject to different coding types and transmission errors. PSQM is used primarily to test networks that have speech compression, digital speech interpolation, and packetization. PSQM of this type has been recommended by the International Telecommunication Union in its telephone recommendations. An example of an objective method for voice signals is ITU-T recommendation P.861.

To estimate the subjective quality of a VoIP call that traverses a packet-switching network, FIG. 1 depicts the basic approach of PSQM that has been adopted. In an objective method a known artificial voice signal 10 is transmitted across the network 12. An artificial voice signal for use in PSQM may be stored in a commonly used file format such as, for example, a wave (.WAV) file. The process of transmitting a known signal to evaluate the degradation in quality after it has traversed a network may be termed an active method since a known test signal is actually injected into and transmitted across the network.

PSQM uses a psychoacoustic model 14 that aims to mimic the perception of sound in real life, and was originally developed to test compressor/decompressors (codecs). A Codec is a software component that translates video or audio between its uncompressed form and the compressed form in which it is stored. The algorithm functions by comparing signal 10 after it has been through a coder 16 and decoder 18.

PSQM provides an output 20 in the range of 0 to 6.5, where values close to 0 indicate very good speech quality, and values close to 6.5 indicate poor speech quality. At the destination, a quality measure or score (e.g. mean opinion score (MOS)) is computed 22 based on the received signal and the known artificial voice signal that was transmitted and is output 24. Although PSQM does not have a direct correlation to MOS, the subjective quality is nevertheless inferred from the objective quality. That is, if a person listens to a speech sample that has a PSQM value of 2, that person would think the quality was worse than a speech sample having a PSQM value of 1. PSQM values can be roughly translated in MOS values.

Accordingly, there is a need for an accurate subjective measurement algorithm for determining the mean opinion score and quality of VoIP packets.

SUMMARY OF THE INVENTION

This invention provides a system and method for the non-intrusive determination of the subjective quality of a packetized real-time media data stream in a packet-switching network. It also provides for the subjective determination of the media data stream without interrupting the flow of the media stream. Moreover, the invention allows for the subjective quality determination of the media stream without the addition of a known test signal into the packet-switching network. Passive subjective quality determination of the media stream using this method prevent perturbing the packets in the media stream, thereby increasing the strength of the subjective results.

A media stream to be measured is transported using packets containing a timestamp, a sequence number, and a source identifier. The type of encoding and packetization method may be known from knowledge that one may have about the media stream being measured or it may be known explicitly from information contained in the media packet headers. For example, in the case of real-time transfer protocol (RTP) packets, the header typically contains a 7-bit payload type field that identifies the format of the RTP payload and determines how it should be interpreted.

First, packets are copied from a network with their associated timestamps and stored in a memory without interfering with the flow of data in the network. The timestamps of the packets are the local time at which the packet is copied, and ensures that temporal correlation can be performed between the original packets and the copied packets. Copied packets are separated into individual streams of packets utilizing the source identifier field in each packet header. The media signal in an individual copied packetized stream is replaced with a known test signal forming a pseudo-media stream. The same methods are used to encode, packetize, depacketize and decode the known test signal as those used on the copied media stream signal. The pseudo-media stream therefore contains all of the faults of the copied signal including any faults incurred in the copied signal during its transmission. The subjective quality of the pseudo-media stream is then measured disclosing the subjective quality of the data signal. These and other advantages of this invention are described in or are apparent from the following detailed description of the preferred embodiments.

BRIEF DESCRIPTION OF THE DRAWINGS

In the drawings:

FIG. 4 depicts packets of a know signal having known packet payloads;

FIG. 5 depicts packets copied from a media stream of interest; and

FIG. 6 depicts a pseudo packet media stream with the media packet payloads of interest replaced with known media payloads.

DESCRIPTION OF THE PREFERRED EMBODIMENT

Figure 1:
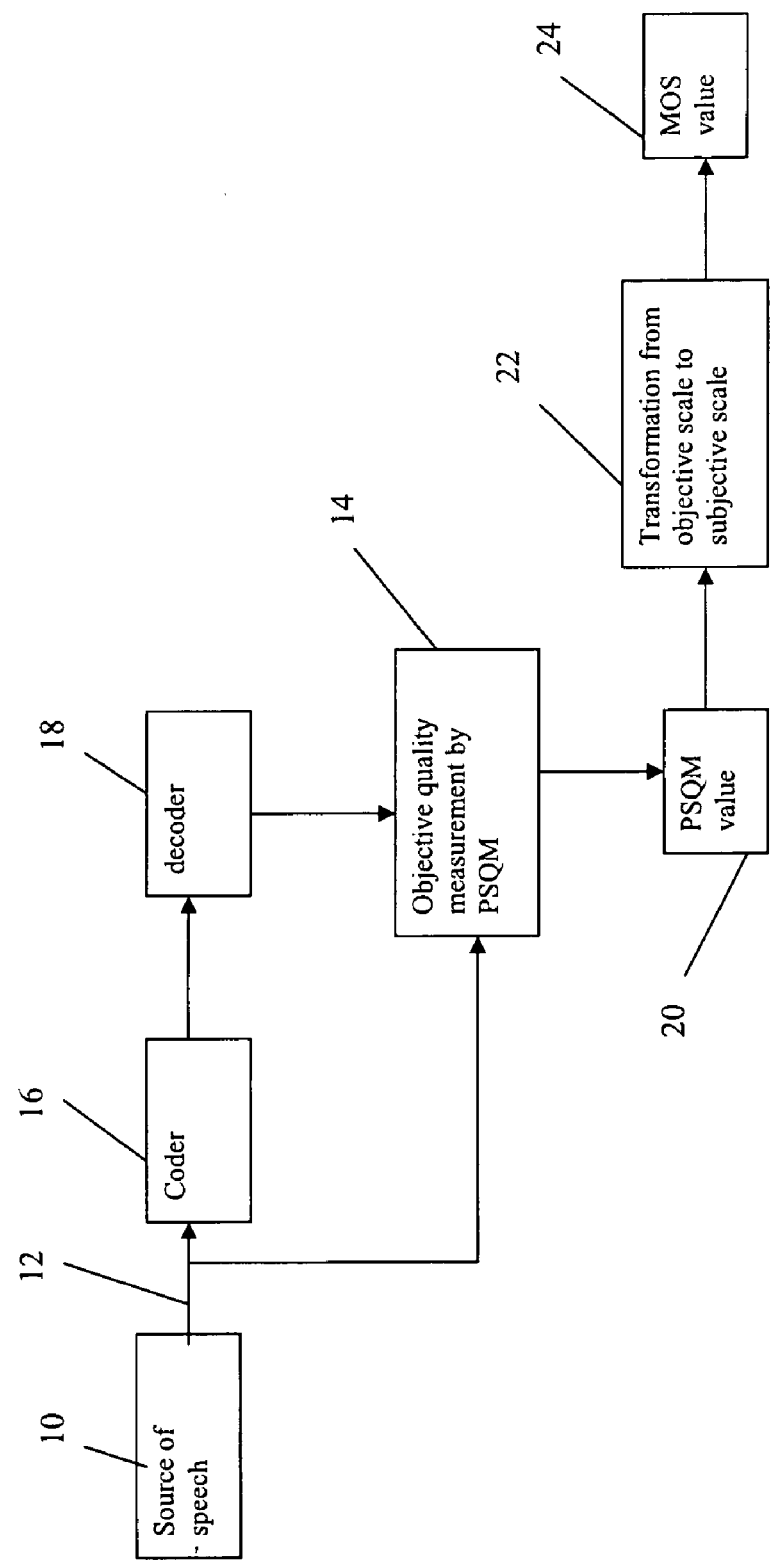
FIG. 1 depicts the prior art PSQM algorithm for measuring the objective quality of a media signal.
Figure 2:
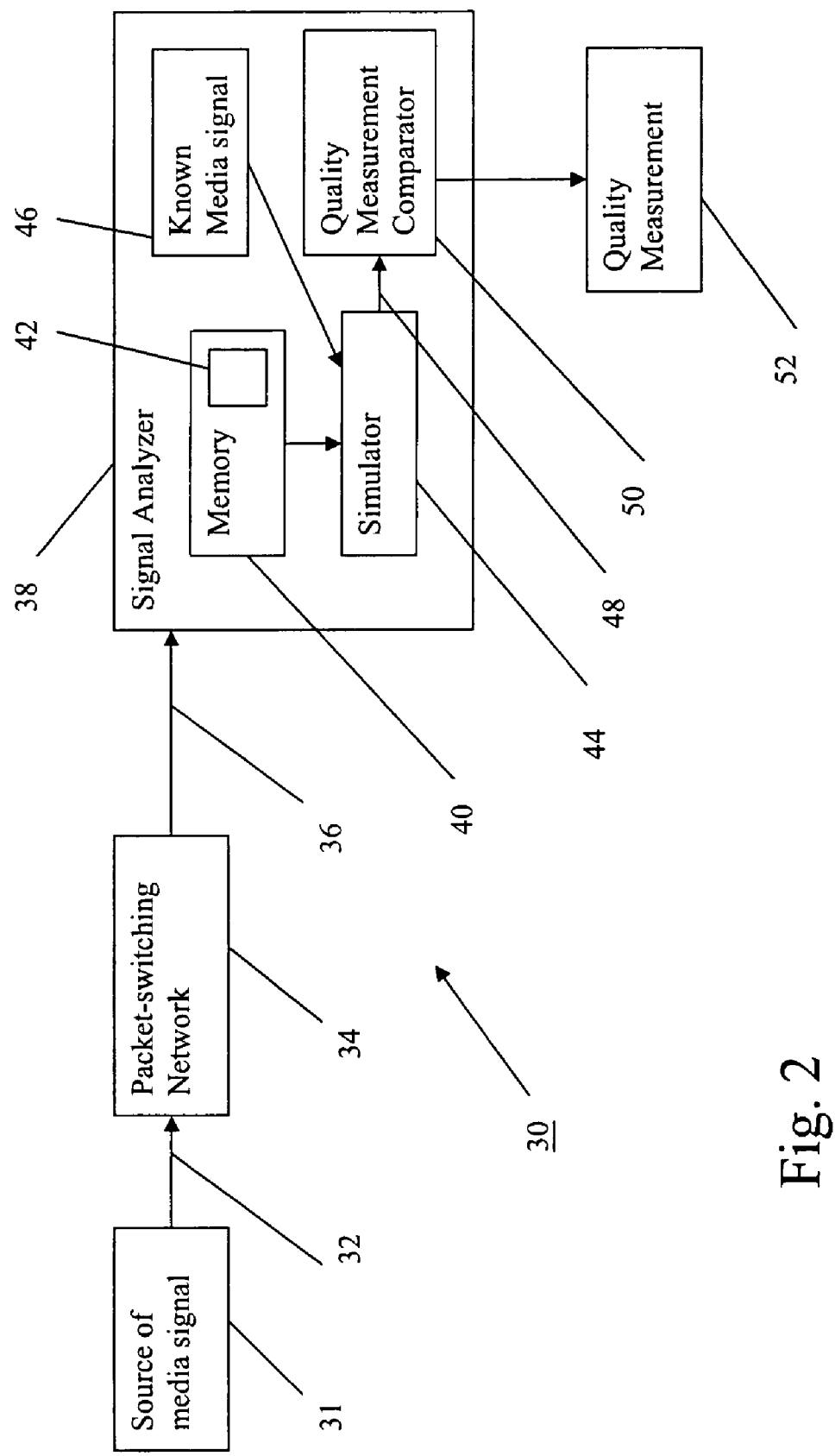
FIG. 2 shows the components of the passive system used to measure the subjective quality of a media signal.

FIG. 2 depicts a passive system 30 for measuring subjective quality of real-time media streams 32 in a packet-switching network 34. The real-time media streams 32 are obtained from a source 31 and can be in an analog or digital. The real-time media streams 32 are digitally encoded and packetized to form a packet stream that is transmitted over the packet-switching network. A packet stream 36 is copied from network 34 without interfering with the data stream carried by the network. For example, a packet stream 36 may be copied from any suitable port, not illustrated, for example, an Ethernet hub, a tap on a transmission link, or a packet-switch that is configured as a switched port analyzer port ('SPAN port'). A SPAN is a switch that extends the monitoring abilities of existing network analyzers into a switched Ethernet environment. SPAN mirrors the traffic at one switched segment onto a predefined SPAN port. A network analyzer 38 attached to the SPAN port can monitor traffic from any other switched ports.

The copied portion of the packet stream is sent to a temporary storage 40 and marking unit 42 where each copied packet is given a timestamp corresponding to the current time at which it is copied.

Memory 40 is preferably implemented using static or dynamic random access memory (RAM). However, memory 40 can also be implemented using one or more of static RAM, dynamic RAM, read-only memory (ROM), flash memory, hard disk drive, compact disc read-only memory (CD-ROM) drive, compact disc-readable/writable (CD-RW) drive, Floppy Disk Drive, Network Servers or the like.

Copied packets 36 are retrieved by a simulator 44, where the packets 36 are separated from the multisource media stream according to information contained in each packet header portion. The encoding/decoding and packetization/depacketization methods used and to be used with the selected single source media stream are also determined by the simulator.

A known media signal 46 is sent to the simulator 44 where the known media signal is encoded and packetized using the same encoding and packetization as the real-time media streams 32, and is substituted into packets 36, and output as pseudo-packets, or pseudo-media stream 48 to a quality measurement comparator 50.

Pseudo-packets 48 contain the known media signal 46 along with all the faults in the selected packets 36. Comparator 50 determines the subjective quality of the pseudo-packets 48, and outputs a quality measurement 52.

Figure 3:
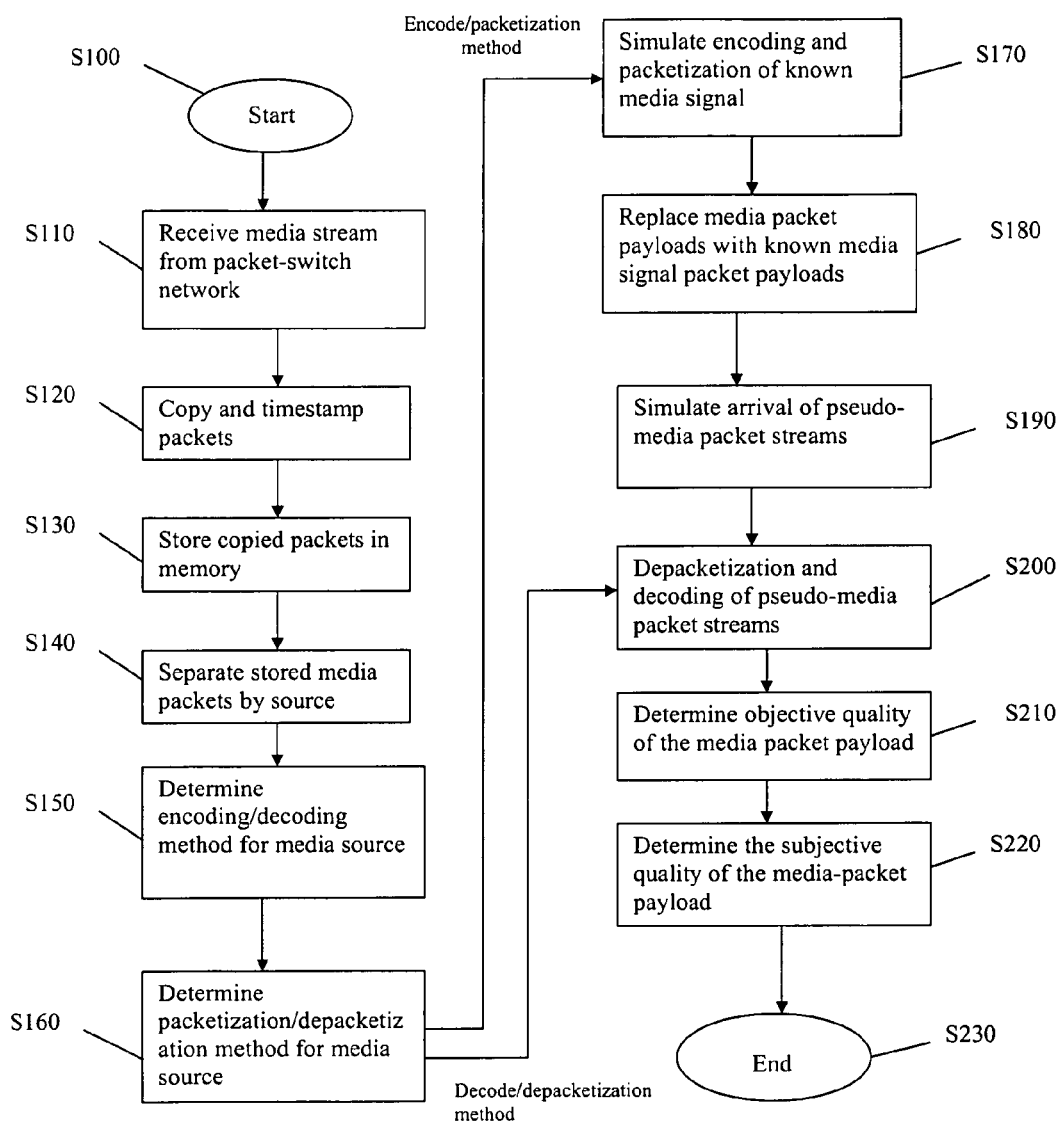
FIG. 3 depicts a flow chart in accordance with the preferred embodiment of the invention.

FIG. 3 depicts a flow chart of the steps to determine the quality of the media signal 32 arriving from source 31, starting at step S100, and continuing to step S110.

In step S110, media stream 36 is received from packet-switching network 34, and continues to step S120. In step S120, packets 26 are copied from network 34 without interfering with the data stream carried by the network, and are timestamped. The process continues to step S130. The copied and timestamped packets are then stored in memory 40 at step S130.

Next, in step S140, the stored packets are separated by their media source, which are identified from source information contained in each packet header portion, and continues to step S150. In step S150, the encoding and decoding methods used by the packets 36 is determined, and the process continues to step S160.

The method of packetization and depacketization of the packets 36 are determined in step S160. The method of encoding/packetization is output to step S170, and the method of decoding/depacketization is output to step S200, and the process continues to step S170.

A known media signal 46 is encoded and packetized in step S170 using the same methods used in encoding and packetizing the selected media stream.

In step S180, the encoded and packetized known signal 46 proceeds to the simulator 44 where the payloads are emptied from each copied packet and a new payload is added corresponding to the encoded and packetized known media signal. It should be noted that each loaded packet in the pseudo-media stream contains the same packet payload that would have been contained in the media packets had the media stream actually carried the known media signal encoded and packetized. The media stream containing the known media signal has all of the same faults as the copied media signals. For example, if packets from the copied medial signal are missing for any reason or are out of sequence, the pseudo-media stream will have the same faults.

Next, in step S180, arrival of the pseudo-media packet streams is simulated, and continues to step S200. In step S200, the pseudo-media packet streams are decoded and depacketized, and continues to step S210.

In step S210, the objective quality of the decoded and depacketized pseudo-media stream is determined, using, for example, PSQM, and continues to step S220. In step S220, the subjective quality of the decoded and depacketized pseudo-media stream is determined, for example, by comparing the decoded and depacketized pseudo-media stream to the known signal before it was inserted into the packet, and determining a quality measurement score, and the process ends at step S230.

The substitution of a known signal into a packet is further illustrated in FIGS. 4–6, where a known media signal 46 is represented. The packets are, for example, real-time transport protocol (RTP) packets, defined in Request for Comments (RFC) 1889, that are commonly used to carry VoIP and other media. In an RTP packet, the header typically includes a 32-bit timestamp, a 16-bit sequence number, and a 32-bit Synchronization Source (SSRC) identifier. Known media signal 46 has been packetized in representation 54 using the same method as that used to packetize the media signal 36 under measurement. In FIG. 5 it can be seen that each packet of the copied signal 36a, 36b, 36c, 36d, 36e and 36f is timestamped and identified by its sequence number ("SN") in the stream. Any corrupted packets are eliminated as they would be at the receiving end in the packet-switching network 34. It should also be noted that there are gaps in the sequence numbers of the copied media stream. As previously mentioned, these gaps could result from many possible problems.

Each packet 36 has a payload portion 56 and a header portion 58 as shown in the legend of FIG. 6. The header portion 58 includes a timestamp, a sequence number and a source identifier. When replacing the media packet payloads the sequence numbers are used to determine which known media signal packet payloads should replace the copied media stream packet payloads. The packet payloads of the media stream 36 contain the encoded digital signal. The payloads 56 of each of the copied and timestamped packets 36a–36f are then emptied and the packets of the known signal 54 are added to the packets 36a–36f to create a pseudo-media stream 48 depicted in FIG. 6.

In FIG. 6, the timestamped pseudo-media stream 48 is shown complete with all the faults present in the copied media signal 36. Note that the packets identified by sequence number (SN) 25, 28 and 29 are missing. The pseudo-media stream 48 containing the packetized known test signal is an accurate representation of the copied media stream. Timestamping of each packet 36 upon copying assures that the signal to be tested has the same temporal sequence of packet elements as the original source media signal 32.

The above described passive system possesses a number of inherent advantages relative to the active system of measuring the subjective quality of media streams, including the following:

First, the passive method can be used anywhere on the network to measure the subjective quality of live real-time media streams that are in the process of being transmitted across the network. The active method can only be used to measure the subjective quality of test media streams that are injected into the network.

Second, the passive method can be used to measure simultaneously the subjective quality of multiple live real-time media streams since the copied packet stream may contain multiple media streams that can be distinguished by their source.

Third, the passive method does not require any sending device. The active method requires a sending device for inserting a packetized test signal into the network.

Fourth, the passive method may be used to measure simultaneously, in one test, the subjective quality of a media stream using more than one subjective quality measurement technique. This is because the passive method does not require the transmission of a test signal and is not restricted to any specific subjective quality measurement technique.

Fifth, the passive method may be used to measure simultaneously the subjective quality of a media stream using more than one known media signal. This is because the passive method does not require the transmission of a test signal and is not restricted to any specific known media signal 46. In the active method, different known media signals would have to be transmitted separately to obtain subjective quality measurements for different known media signals.

Sixth, the passive method may be used to measure simultaneously the subjective quality of a media stream using more than one subjective quality measurement technique and more than one known media signal. This is because it is possible to simultaneously use more than one subjective quality measurement technique and, for each such technique, utilize more than one known media signal.

Seventh, the passive method is not restricted to any particular media type (e.g. voice, video, audio, or combinations thereof (multimedia), since no assumptions are made regarding the form of the media signal.

Eighth, the passive method may be repeated periodically in time under automatic control to enable the continuous monitoring of the subjective quality of media streams.

The above described advantages of the passive system are by no means meant to limit the scope of the invention. Though the invention has been described with respect to a single preferred embodiment thereof, many variations and modifications will become apparent to those skilled in the art. It is therefore the intention that the claims be interpreted as broadly as possible in view of the prior art, to include all such variations and modifications.

What is claimed is:

1. A method for determining subjective quality of a packetized media data stream having packets of encoded data, each of said packets having a header portion and a data portion each having content, comprising the following steps:

copying a portion of said packetized media data stream to obtain copied packets;

replacing the content of the data portion of said copied packets with a packetized known test signal, said copied packets thereby comprising a pseudo-media stream;

determining subjective quality of said pseudo-media stream; and using said subjective quality of said pseudo-media stream, to determine subjective quality of said packetized data stream wherein each packet copied from said packetized data stream is time stamped and said time stamping is used to control the temporal relationship between said copied portion of said packetized media data stream and said pseudo-media stream.

2. The method of claim 1 wherein the step of determining the subjective quality of the pseudo-media stream includes inputting the pseudo-media stream into a signal comparator with the packetized known test signal.

3. A method for determining subjective quality of a packetized data stream having packets of encoded data, each of said packets having a header portion and a data portion each having some content, comprising the following steps:

copying a portion of said packetized data stream to obtain copied packets;

time stamping each packet included within said packetized data stream as it is copied;

emptying data content of the data portion of each copied packet;

loading a known test signal into each emptied packet;

using said time stamping to maintain a temporal sequence of the loading to produce a pseudo-media stream;

depacketizing and decoding said pseudo-media stream to obtain a pseudo-media signal; and determining said subjective quality of said pseudo-media signal that represents the subjective quality of said packetized data stream.

4. The method for determining subjective quality of a packetized data stream of claim 3, further comprising:

determining packetization methodology used to packetize said data stream; and utilizing said packetization methodology to packetize said known test signal prior to loading said known test signal into said empty packets.

5. The method for determining subjective quality of a packetized data stream of claim 3, wherein each of said header portion contains a source identifier; and where said method further comprises separating said copied packetized data stream by source using said source identifier portion of each copied packet.

6. The method for determining subjective quality of a packetized data stream of claim 5, wherein said header portion of each copied packet includes a sequence number and said sequence number is used to determine which packetized known test signal packet replaces a copied media stream packet for said pseudo-media stream.

7. The method for determining subjective quality of a packetized data stream of claim 6, wherein order of the sequence numbers is maintained in substituting said packetized known test signal for the data contained in each copied packet.

8. The method of claim 3 wherein the step of determining the subjective quality of the pseudo-media stream includes inputting the pseudo-media stream into a signal comparator with the packetized known test signal.

9. A method for determining subjective quality of a multi-media-source packetized data stream of packets each having data content, said method comprising the following steps;

copying a portion of said multi-media-source packetized data stream to obtain copied packets; time stamping each of said copied packets to obtain time stamped copied packets;

separating said copied packets according to their respective media sources to obtain a separated multi-media stream;

selecting a media stream from said separated multi-media stream to obtain a selected media stream;

identifying encoding/decoding and packetization/depacketization methods used on said selected media stream;

replacing said data content of each copied packet in said selected media stream with a packetized known test signal while maintaining the sequence of said copied packets to produce a pseudo-media stream;

depacketizing and decoding said pseudo-media stream using said time stamped copied packets to maintain the same temporal sequence as that with which the packets were originally copied to produce a pseudo-media signal; and measuring subjective quality of said pseudo-media signal to determine subjective quality of said selected media stream.

10. The method of claim 9 wherein the step of measuring the subjective quality of the pseudo-media stream includes inputting the pseudo-media stream into a signal comparator with the packetized known test signal.

11. A system for measuring subjective quality of a real-time packetized media stream in a packet-switching network comprising:

means for copying a portion of said media stream from said packet-switching network;

means for emptying a payload portion of selected packets from said copied media stream portion, resulting in empty payload portions of the selected packets;

means for reloading the empty payload portions of the selected packets with a known media signal to produce a pseudo-media stream;

means for depacketizing and decoding said pseudo-media stream to produce a pseudo-media signal; and means for measuring the subjective quality of said pseudo-media signal and in turn the subjective quality of said packetized media stream.

12. The system for measuring subjective quality of a real-time packetized media stream in a packet-switching network of claim 11, further comprising:

means for time stamping each packet copied from said media stream, and means for using said timestamp on said copied packet to coordinate the loading of said known media signal into said emptied packets.

13. The system for measuring subjective quality of a real-time packetized media stream in a packet-switching network of claim 11, further comprising:

means for determining encoding and packetizing method used to prepare the packets in said copied media stream; and means for using said encoding and packetizing method to prepare the packets containing the known media signal.

14. A system for measuring subjective quality of a real-time packetized media stream in a packet-switching network of claim 11, further comprising:

means for determining decoding and depacketizing methods to be used with said copied media stream; and means for using said decoding and depacketizing methods on said known media signal.

15. A system for measuring subjective quality of a real-time packetized media stream in a packet-switching network of claim 11, further comprising:

means for determining the encoding/decoding and packetization/depacketization methods used with the copied packets in said media stream; and means for using encoding/decoding and packetization/depacketization methods in handling the packets of the known media signal in the preparation of said pseudo-media stream.

16. The system of claim 11 wherein the means for measuring the subjective quality of said pseudo-media signal comprises a signal comparator.

17. An apparatus for measuring subjective quality of information contained in a packetized data stream comprising:

a first device that copies a portion of said packetized data stream;

a second device that substitutes a known test signal for the information contained in the copied portion of said packetized data stream to produce a pseudo-media stream;

a third device that depacketizes and decodes said pseudo-media stream to produce a pseudo-media signal; and a fourth device that determines subjective quality of said pseudo-media signal and subjective quality of the information contained in said packetized data stream.

18. The apparatus for measuring subjective quality of information contained in a packetized data stream of claim 17, wherein said second device includes:
   means for emptying the information content of each of said copied packet; and
   means for loading a packetized known test signal into each of said empty packets.

19. The apparatus of claim 17 wherein said fourth device comprises a signal comparator.

20. An apparatus for measuring subjective quality of the information contained in a single packetized data stream included in a multi-source packetized data stream comprising:
   a first device for copying a portion of said multi-source packetized data stream;
   a second device for separating a single packetized data stream from said copied portion of said multi-source packetized data stream;
   a third device for replacing the information content of each copied packet with a known signal to create a pseudo-media stream;
   a fourth device for depacketizing and decoding said pseudo-media stream to produce a pseudo-media signal; and
   a fifth device for measuring the subjective quality of said pseudo-media signal and in-turn the subjective quality of the information contained in said single packetized data stream.

21. An apparatus for measuring the subjective quality of the information contained in a single packetized data stream included in a multi-source packetized data streaming as set forth in claim 20, wherein said second device reads a source identifier contained in each copied packet; and diverts selected packets having a common source identifier.

22. An apparatus for measuring the subjective quality of the information contained in a single packetized data stream included in a multi-source packetized data streaming as set forth in claim 20 wherein said third device empties the information content of each packet of said separated single packetized data stream and loads a packetized known test signal into said empty packets.

23. An apparatus for measuring subjective quality of the information contained in a single packetized data stream included in a multi-source packetized data streaming as set forth in claim 20 including:
   means for identifying the encoding/decoding and packetization/depacketization methods used on and to be used on the information contained in said single packetized data stream, and means for using said encoding and packetization methods in the preparation of said pseudo-media stream; and
   means for using said decoding and depacketization methods in the preparation of said pseudo-media signal.

24. The apparatus of claim 20 wherein said fifth device comprises a signal comparator.

25. An apparatus that measures subjective quality of information contained in a packetized media stream containing a plurality of packets, each of said packets having a header portion and a payload portion, comprising:
   a first device that copies a segment of said packetized media stream;
   a second device that substitutes a known test signal for the payload portion of said packets in said copied media stream segment and creates a pseudo-media stream;
   a third device that depacketizes and decodes said pseudo-media stream to produce a pseudo-media signal; and
   a fourth device that determines subjective quality of said pseudo-media signal and subjective quality of the information contained in said packetized media stream.

26. The apparatus of claim 25, wherein said copied segment of the packetized media stream is stored in a memory.

27. The apparatus of claim 25, wherein said second device determines the encoding scheme of said packetized media stream.

28. The apparatus of claim 25, wherein the second device determines the packetization scheme of said packetized media stream.

29. The apparatus of claim 25, wherein said second device encodes and packetizes the known test signal.

30. The apparatus of claim 25 wherein said fourth device comprises a signal comparator.

* * * * *